(12) United States Patent
Sun

(10) Patent No.: US 8,344,040 B2
(45) Date of Patent: Jan. 1, 2013

(54) POLYOLEFIN TREATMENT PROCESS FOR UNIFORM CROSSLINKING

(76) Inventor: Dehchuan Sun, Taipei (TW)

( * ) Notice: Subject to any disclaimer, the term of this patent is extended or adjusted under 35 U.S.C. 154(b) by 15 days.

(21) Appl. No.: 13/398,879

(22) Filed: Feb. 17, 2012

(65) Prior Publication Data

US 2012/0178846 A1 Jul. 12, 2012

Related U.S. Application Data

(63) Continuation of application No. 12/986,163, filed on Jan. 6, 2011.

(51) Int. Cl.
*C08F 110/02* (2006.01)
*C08F 10/00* (2006.01)
*C08F 110/00* (2006.01)

(52) U.S. Cl. .................................. 522/161; 526/352.2

(58) Field of Classification Search .......... 522/157–161; 526/348–352.2
See application file for complete search history.

(56) References Cited

U.S. PATENT DOCUMENTS

| 6,165,220 A * | 12/2000 | McKellop et al. | 128/898 |
| 6,228,900 B1 * | 5/2001 | Shen et al. | 522/153 |
| 2008/0036111 A1 * | 2/2008 | Sun | 264/85 |
| 2009/0243159 A1 * | 10/2009 | Sun | 264/494 |

* cited by examiner

*Primary Examiner* — Nathan M Nutter
(74) *Attorney, Agent, or Firm* — Louis Ventre, Jr.

(57) ABSTRACT

A process produces a block of polyolefin material with uniform crosslinking, which may be uniform between and within polymer chains in the polyolefin material. Steps include: providing an oven; placing the block into the oven; preheating the block to a uniform temperature above the melting point; further heating the block to a temperature at least 30 degrees Centigrade above the melting point; cooling the block to room temperature under an inert gas; and removing oxidized material from surface of the block. Optional steps include: subjecting the block to radiation before placing the block into the oven; removing the gases from the oven on a continuous or stepwise basis; controlling the purge gas flow out of the oven; and determining a heating time period for the block by subjecting control blocks to the same process and analyzing them after various heating times.

8 Claims, 2 Drawing Sheets

US 8,344,040 B2

POLYOLEFIN TREATMENT PROCESS FOR UNIFORM CROSSLINKING

CROSS-REFERENCE TO RELATED APPLICATION

This application is a continuation of U.S. application Ser. No. 12/986,163, filed Jan. 6, 2011, which is hereby incorporated by reference herein.

TECHNICAL FIELD

In the field of synthetic resins, a process of preparing a polyolefin using heat and/or wave energy to induce a physical and chemical reaction promoting uniform crosslinking in the polyolefin without changing the chemical composition of the polymer, without creating short polymer chains and enabling removal of oxidized polymer.

BACKGROUND ART

A polyolefin is a polymer produced from a simple olefin as a monomer. For example, polyethylene is the polyolefin produced by polymerizing the olefin ethylene. An olefin is also called an alkene with the general formula $C_nH_{2n}$ and a polyolefin is also known as a polyalkene. Polypropylene is another common polyolefin which is made from the olefin propylene.

By definition, cross-links are connecting points that link one polymer chain to another. There are two types of crosslinks: chemical crosslinks are covalent bonds that bridge the polymer chains; and physical crosslinks are hydrogen bonds or chain entanglements between neighboring chains.

There are two commonly employed processes for the formation of chemical crosslinks in polymers. These are deficient in that they either change the chemical composition of the polymer or create short polymer chains.

The first such commonly employed process involves use of a crosslinking agent, such as peroxide, vinylsilane, or ethylene glycol dimethacrylate. The crosslinking agent is premixed with un-polymerized or partially polymerized resin powders. Cross-links are then formed in the resultant material by chemical reactions that are initiated by heat, pressure, change in pH, or radiation during the consolidation step. The main advantage of this method of crosslinking is that the distribution of crosslinks is substantially uniform. The major drawback of this method is that the resultant material often has a different chemical composition than that of the starting material due to the inclusion of the crosslinking agent. For medical implant applications, for instance, a pure polymer with proven biocompatibility is preferred.

The second method of crosslinking exposes a polymer to a radiation source, such as electron beam or gamma rays. During irradiation, free radicals are produced by breakage of covalent bonds in the polymer. Free radicals then react with each other during irradiation or post-irradiation to form crosslinks.

The main advantages of this second method are process simplicity, low cost, and no change in chemical composition. There are major shortcomings for the second method, however. The first major shortcoming is that the distribution of crosslinks in the polymer is non-uniform. The non-uniformity arises from the radiation dose distribution in the polymer.

The second major shortcoming is that irradiation penetration from the surface of the polymer may not be thorough. For e-beam irradiation, the limited power of penetration results in a higher dose near the surface while lower or zero dose in the interior. Although gamma rays penetration is much deeper than e-beam irradiation, larger blocks of material (such as 4 inches or thicker) still show dose variation between a surface zone and the interior. Independent of block size, radiation dose goes through to a maximum point at a sub-surface depth (about 2 to 7 mm depth, depending on the material density, radiation conditions, etc.) before its decline into the interior. This phenomenon is known as secondary ion or Compton Effect.

The third major shortcoming is that crosslinking reactions of free radicals are often incomplete; leaving residual free radicals in the material that can cause oxidation or other chemical changes during storage or field applications. It is well known that material properties are deteriorated when a polymeric material is oxidized.

The fourth major shortcoming is that during high energy radiation, short chains are formed as a result of chain breakage along the backbone of the polymer. In general, the amount of short chains is increased with increasing radiation dose. Short chain formation tends to weaken the material strength as the effective molecular weight is reduced.

As defined earlier, physical crosslinks do not involve covalent bonds but enhance molecular network through hydrogen bonding or chain entanglements. In crystalline polymers, chain entanglements exist in the amorphous regions which are critical micro-structures for material strength.

SUMMARY OF INVENTION

A process and resulting product is disclosed. The process produces a block of polyolefin material with uniform crosslinking, which uniformity may be both between polymer chains and within polymer chains in the polyolefin material. The process includes steps of providing an oven; placing the block into the oven; preheating the block to a uniform temperature above the melting point and up to about 30 degrees Centigrade above the melting point; further heating the block to a temperature at least 30 degrees Centigrade above the melting point, said temperature causing the carbon-carbon bond breakage within the microstructure; terminating heating of the block in the oven when a pre-determined crosslinking density level is reached; cooling the block to room temperature under an inert gas to bring the material back to the solid state; and removing any oxidized material from surface of the block. The process may include steps of: subjecting the block to radiation before placing the block into the oven; removing the gases from the oven on a continuous or stepwise basis; controlling the purge gas flow out of the oven during the preheating and heating steps to remove gases emitted from the block; and determining a heating time period for the block by subjecting control blocks to the same process and analyzing them after various heating times.

Technical Problem

Incomplete crosslinking, non-uniform crosslinking, chemically altered polymer and oxidized polymer have been shown to decrease wear resistance, increase creep, and degrade certain desirable mechanical or physical properties of polymers. Non-uniform crosslinking can cause early failure of material upon loading in industrial or medical applications.

In orthopedic implant applications, certain parts of the material are designed for screw holes and flanges while other parts for actual loading or articulating surfaces. Non-uniformity can cause critical regions to crack and fail.

Current polyolefin irradiation processes, including post-irradiation annealing and post-radiation remelting, are unable to induce breakage of C—C bonds and thus unable to redistribute the crosslinks in the irradiated polyolefin as in the present invention.

Irradiated and oxidized polyolefin resulting from current treatment process to increase crosslinking, cause brittleness and reduced strength.

Gamma irradiated and shelf-aged polyolefin contains short polymer chains negatively affecting melting characteristics and crystallinity of the polyolefin.

Gamma irradiation introduces a significant number of free radicals in the polyolefin, which result from the breakage of covalent bonds in the polymer. This weakens the polyolefin.

Advantageous Effects of Invention

The present process provides a new polyolefin, which is a new polymeric material, with superior wear resistance, lower creep potential, less brittleness and enhanced strength. The process achieves this new polymeric material by producing a polyolefin with uniform chemical crosslinking, enhanced physical crosslinking, no chemical alteration by avoiding use of a crosslinking agent, a reduced amount of short chains, and removed oxidation.

In the industrial and medical industries, no one has heretofore achieved uniform chemical crosslinking following radiation as is obtainable using the present process. So, the present process will realize improved material properties, such as in enhanced wear resistance and reduced brittleness. Thus, the present process improves mechanical properties for a previously irradiated and shelf-aged polyolefin.

While, uniform chemical crosslinking induced by a chemical agent is known, this alters polymer chemistry and does not involve improving physical crosslinking as in the present process.

High temperature treatment taught in the present process removes short chains in gamma irradiated and shelf aged polyolefin. As a result, melting characteristics and crystallinity are restored.

The unique cooling step disclosed in the present process is effective to recombine free radicals generated by gamma irradiation and in the heating steps of the present process. The polymeric material resulting from the present process contains virtually no free radicals, which substantially improves the polyolefin material.

BRIEF DESCRIPTION OF DRAWINGS

The drawings illustrate preferred embodiments of the method of the invention and the reference numbers in the drawings are used consistently throughout. New reference numbers in FIG. 2 are given the 200 series numbers.

DESCRIPTION OF EMBODIMENTS

In the following description, reference is made to the accompanying drawings, which form a part hereof and which illustrate several embodiments of the present invention. The drawings and preferred embodiments of the invention are presented with the understanding that the present invention is susceptible of embodiments in many different forms and, therefore, other embodiments may be utilized and structural, and operational changes may be made, without departing from the scope of the present invention. For example, the steps in the method of the invention may be performed in any order that results making or using the polyolefin with uniform crosslinking.

Figure 1:
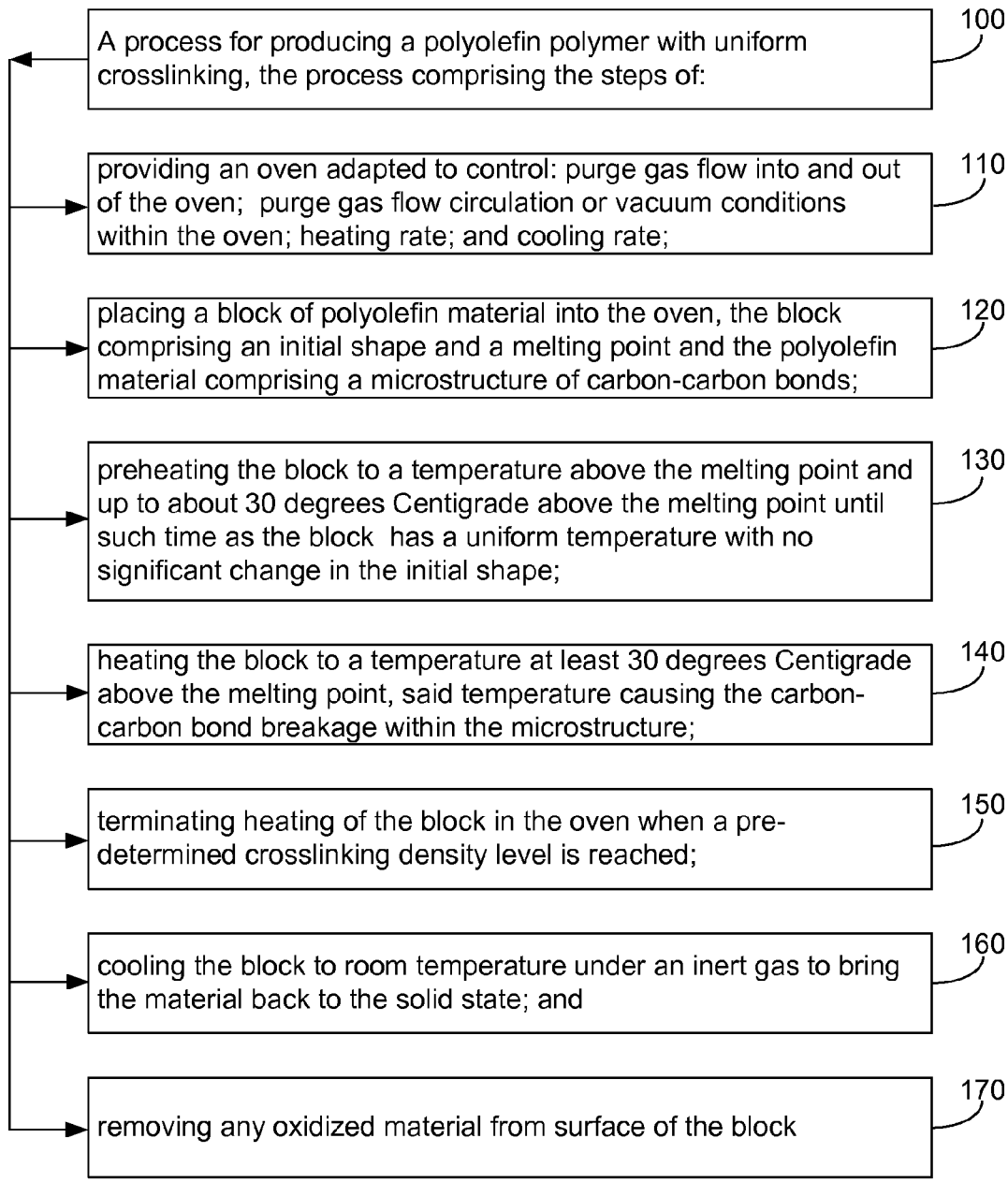
FIG. 1 illustrates steps in a preferred embodiment of the present process.
Figure 2:
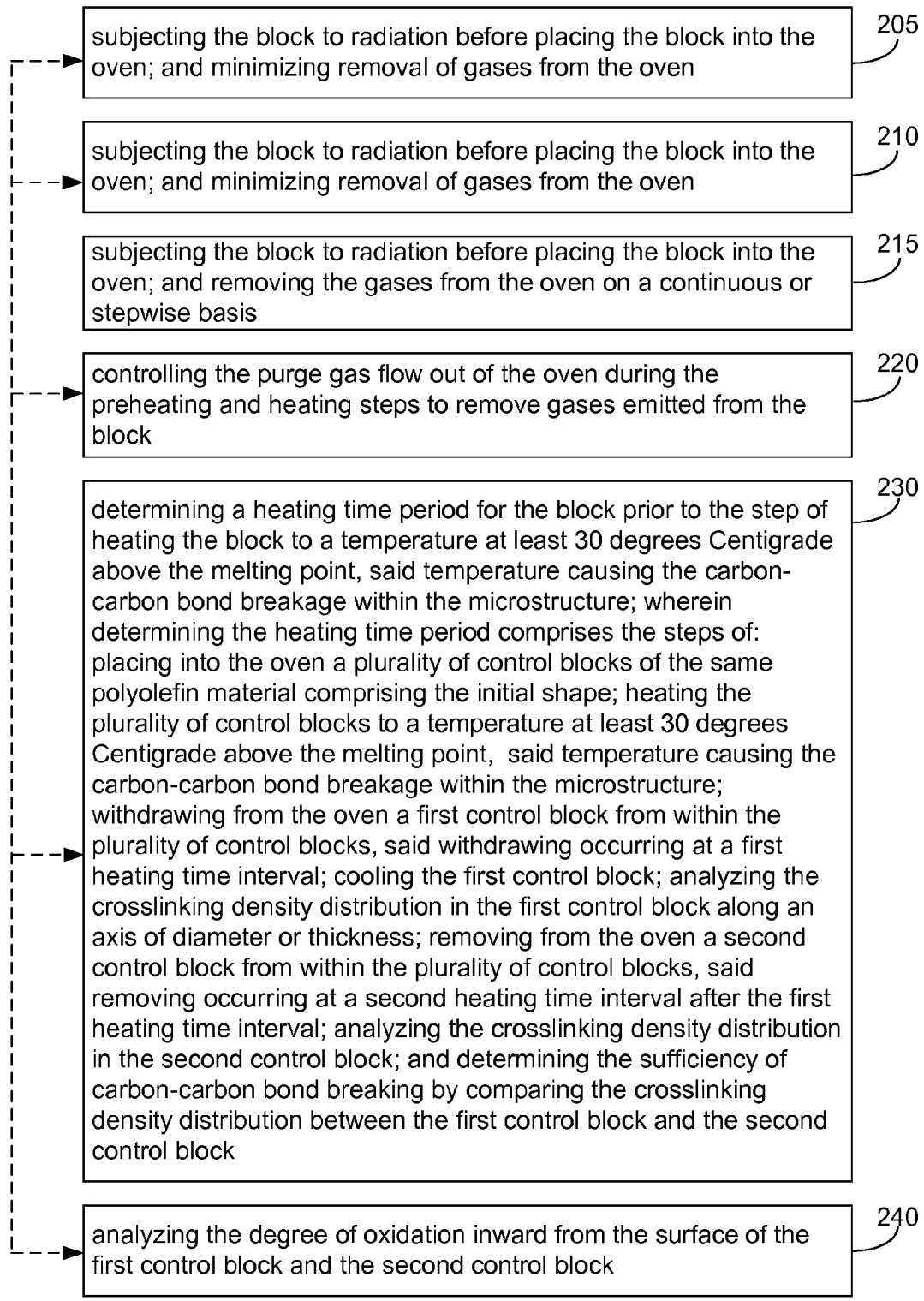
FIG. 2 illustrates steps in alternative embodiments of the present process.

FIG. 1 illustrates steps in a preferred embodiment of a process (100) with 7 steps for producing a polyolefin polymer with uniform crosslinking from solid polymers as starting materials. The shapes may be blocks, bars, semi-finished products (pre-forms), or finished products.

The process (100) comprises a first step (110) of providing an oven adapted to control: purge gas flow into and out of the oven; purge gas flow circulation or vacuum conditions within the oven; heating rate; and cooling rate. An oven with purge gas flow circulation may be replaced with an oven providing vacuum conditions because vacuum conditions may substitute for purge gas flow.

The process (100) comprises a second step (120) of placing a block of polyolefin material into the oven, the block comprising an initial shape and a melting point and the polyolefin material comprising a microstructure of carbon-carbon bonds.

The process (100) comprises a third step (130) of preheating the block to a temperature above the melting point and up to about 30 degrees Centigrade above the melting point until such time as the block has a uniform temperature with no significant change in the initial shape.

The third step (130) of preheating the block enables the production of a uniformly crosslinked material. For useful parts in medical or industrial applications, the sizes or dimensions are often in the order of inches. Due to heat transfer limitations (polymers are known to have poor heat conductivity), the temperature spread across the material thickness (and length) is high.

Preferably, the rates and extents of required chemical reactions are controlled by thermal history (i.e. temperature and time). Thus, a uniform thermal history is useful in the process. Any non-uniformity in temperature or duration will result in a material with significant spread in crosslinking density.

The selection of the pre-heating temperature should satisfy two criteria: (a) the temperature must be at or above the melting point of the polymer so that the melting process is completed in this pre-heating step, rather than during the fourth step (140) of heating. Experiments have shown that melting takes up a significant amount of heat, requires a long period of heating time (hours) and creates temperature gradients before equilibrium; (b) at the pre-heating temperature, bond-breakage reactions should be inactive.

Bond-breakage reactions are designed to take place during the fourth step (140) of heating, not in the third step (130) of pre-heating. If they occur prematurely, the non-uniformity of free radical formation (and thus crosslinking density) created in the third step (130) of preheating is difficult to reverse. For example, a minimum active temperature for free radical formation for ultra high molecular weight polyethylene (UHMWPE) is about 180 Centigrade (also herein abbreviated as C). Setting a pre-heating temperature at a higher value (but below about 180 C) will shorten the time required for complete melting.

When a UHMWPE block is melted, the material appearance changes from opaque to translucent. When the block is completely melted, light can pass through the material block and thus human eyes can see through the material. If the pre-heating temperature is set too high (higher than about 180 C), polymer degradation reactions (i.e. carbon-carbon bond breakage) will occur and the material surface color will darken. It is preferable to allow the pre-heating to continue for some time after complete melting because the temperature spread in the material block is further reduced as the heat transfer approaches equilibrium.

The process (100) comprises a fourth step (140) of heating the block to a temperature at least 30 degrees Centigrade above the melting point, said temperature causing the carbon-carbon bond breakage within the microstructure.

For practical use, the temperature in this fourth step (140) should be between 180 C and 400 C. If the temperature is above 400 C, it is impractically difficult to control the reaction rate. The damaged surface zone may also be too deep for any surface oxidation removal step process to be useful. Also, if the block size is larger than about 100 inches in diameter, heat transfer will take a very long time to the extent that a uniform block temperature is never reached in a practical time period.

The process (100) comprises a fifth step (150) of terminating heating of the block in the oven when a pre-determined crosslinking density level is reached. This may be done by removing the block from the oven or simply turning off the oven.

The process (100) comprises a sixth step (160) of cooling the block to room temperature under an inert gas to bring the material back to the solid state. This may be done in the oven or in a separate device.

Once the pre-determined heating time is reached, the oven starts cooling to bring the molten material blocks back to the solid state. During cooling, all free radicals, now distributed uniformly, will react with each other, pair-by-pair, to form chemical crosslinks. It is preferred to use a slow cooling rate (such as 0.1 degree C. per minute) to ensure that little residual stress is created in the final material. Slow cooling also ensures that the crystallinity meets the minimum of the industrial or medical standards. In general, slow cooling produces superior mechanical properties. It is recommended to employ inert atmosphere (vacuum, helium, nitrogen, etc.) for this cooling step so that no oxidation occurs in the material.

The process (100) comprises a seventh step (170) of removing any oxidized material from surface of the block. The thickness of the damaged surface zone is primarily dependent on the heating temperature, the heating time, and the oven gas removal rate. The thickness of the damaged surface zone is preferably determined by: (a) obtaining the oxidation index profile along the axis of diameter or thickness by FTIR (ASTM 2102), (b) when the oxidation index (decreasing with increasing depth) is smaller than a pre-determined level at a specific depth, the surface zone thickness is determined.

For illustration purposes, examples herein use ultra high molecular weight polyethylene (UHMWPE) as the representative material for the polyolefin. However, many of other polymeric materials with unique features described above can be produced by employing the concepts and the processes disclosed in the invention. UHMWPE is a linear polyethylene (CH3-nCH2-CH3) with the molecular weight in the range of millions, usually between 2 and 6 millions. It has been commonly used for medical implants, engine parts, and other load-bearing, impact-resistant, or wear-resistant materials.

Example 1

For producing a polymer with enhanced and uniform physical crosslinking, steps include:
   (1) Using solid UHMWPE block as the starting material;
   (2) Placing the UHMWPE block in an oven with controlled purge gas flow (in, out, and internal circulation), heating, and cooling capabilities;
   (3) Pre-heating the UHMWPE block at a temperature which is about 0-30 C above the melting point (such as 170 C; UHMWPE's melting point is about 130-140 C) until the block is completely melted (due to the abundant chain entanglement, the molten UHMWPE block maintains its shape with no significant flow);
   (4) Heating the UHMWPE block at a temperature at least 30 C above its melting point to cause the carbon-carbon bond breakage along the polyethylene backbone. The gas environment in the oven can be air or inert gas (such as vacuum, nitrogen, argon, or helium). The oven chamber temperature must be uniform by a convective gas flow. Gases in the oven should be removed on continuous or stepwise basis at a specific rate;
   (5) Controlling the total heating time in Step (4) and the amount of the gas flowing out of the oven during the step (4) so that a pre-determined crosslinking density level is reached;
   (6) Cooling the UHMWPE block to room temperature to bring the material back to the solid state;
   (7) Removing the damaged surface zone before actual use. The thickness of the damaged surface zone is determined by the following steps: (a) obtaining the oxidation index profile along the axis of diameter or thickness by Fourier Transform Infrared Spectrophotometer (herein FTIR), (ASTM 2102), (b) when the oxidation index (decreasing with increasing depth) is smaller than a pre-determined level at a specific depth, the surface zone thickness is determined.

In regard to the heating step (4) in Example 1, the high temperature ensures that all free radicals produced by breakage reactions are distributed uniformly, as long as the temperature in the material block is uniform.

Further in regard to the heating step (4) in Example 1, the bond energy of C—C covalent bonds is about 80 kilo calories (herein abbreviated as kcal) per mole. For UHMWPE, the temperature must be at least 160 C (the melting point of UHMWPE is 130-140 C) for the C—C breakage to take place along the polymer backbone at measurable levels. For practical use, the temperature should be between 180 and 400 C. The breakage and the re-combination of two neighboring carbons occur in a dynamic manner as illustrated by the Equation (v) below. Similar breakage reactions can continue to produce shorter polymer chains, as illustrated in Equation (vi) below:

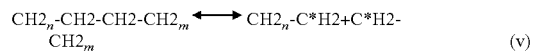

(v)

(note: * represents the free radical site; n and m depict repeating CH2 units).

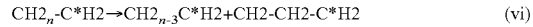

(vi)

(note: successive breakage reactions are represented by Equation (vi)). In the equations, C represents carbon, H represent hydrogen.

Short and long polymer chain segments can be produced by the breakage Equations (v) and (vi). The amount of short chain hydrocarbons is increased with increasing temperature and time as successive breakage reactions take place causing a significant reduction of molecular weight. During the heat treatment, if no gases are allowed to escape from the oven, equilibriums of the Equations (v) and (vi) are soon reached with the number of net C—C breakage limited to a very low level. In other words, the Equation (v) is leaned towards the left. In essence, no free radicals are created and thus no crosslinks are formed. This condition is in contradiction to our objective for obtaining enhanced crosslinking and should be avoided. Thus, in this example, gases in the oven during heat treatment should be removed on continuous or stepwise basis at a specific rate. An example of continuous gas removal is to turn on a vacuum pump that is connected to the oven chamber via a tubing. A vacuum gauge is often equipped with the setup to monitor the degree of vacuum in the oven chamber. Another example of continuous gas removal is to purge a gas (such as nitrogen or helium) into the oven chamber continuously. The setup often equips with a pressure gauge to monitor the gas pressure inside the oven, which should be maintained at a positive level (higher than atmospheric pressure) to ensure purge gas flow. During such operation, the purges gas flows out of oven continuously, carrying together the emitted gases from the polymer block. An example of stepwise gas removal is to turn the above-mentioned vacuum pump on and off periodically (such as 30-second on and 10-second off). Another example of stepwise gas removal is to purge a gas into the oven periodically (such as 1-min purging and 20-seconds off). Yet, another example of stepwise gas removal is to turn on gas purge for a period of time followed by vacuum pumping for another period of time, and then repeating.

Equation (iii) (set forth below) and Equation (v) (set forth above) represent bond breakage reactions between C—C bonds. The key difference between Equation (iii) and Equation (v) is that the former describes the breakage of branched C—C crosslinks, while the latter that of linear backbone C—C bonds. In either case, at a high temperature for a sufficient time, short chain hydrocarbon free radicals will be formed due to these breakage reactions. As the molecular weights get reduced, some will become gases and escape from the polymer matrix. The reaction temperature and time required to reach a significant extent of reactions in Equation (iii) and Equation (v) are similar so that steps to control processing conditions are essentially the same.

In regard to cooling step (5) in Example 1 above, gases in the oven should be allowed to escape from the oven during the heating step (4). Under this condition, the reaction is leaned towards the right with the number of C—C breakage increased with the temperature, time, and the gas escape rate. Preferably, the extent of the Equations (v) and (vi) and thus the amount of crosslinking will be pre-determined using control blocks as described herein. In principle, if more alkyl free radicals are to be formed (forward reaction), more gases should be removed and longer heating time should be used. More crosslinks will be formed in this case upon subsequent cooling (described in the next step). Conversely, if fewer free radicals are to be formed, gas removal rate should be reduced (backward reaction) and a shorter heating time should be used. Gas removal can be accomplished by known methods, such as vacuum suction, inert gas purging, etc.

In regard to cooling step (6) in Example 1 above, once the pre-determined heating time is reached, the oven starts cooling to bring the molten material blocks back to the solid state. During cooling, all free radicals, now distributed uniformly, will react with each other, pair-by-pair, to form crosslinks. The crosslinks formed in this step are physical (rather than chemical) in nature, in strong contrast to those chemical crosslinks that may be induced by irradiation.

In Example 1, the starting material is not irradiated. When C—C bonds along the polymer backbone are broken, chain-end alkyl free radicals are formed (no hydrogen free radicals formed as shown in Equations (v)), which then react with each other to re-connect, according to Equation (vii):

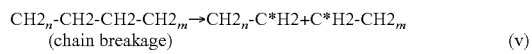
(chain breakage)      (v)

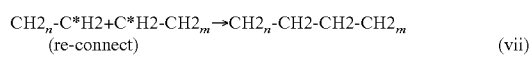
(re-connect)      (vii)

In Equation (vii), since all free radicals are at chain ends, the re-connections can only be formed along the polymer backbone. Although Equation (vii) can bring the polymer structure to the original one with free radicals reacting to their original neighbors before breakage to form the same polymer backbone (full recovery and no net change), the majority of polymer chains carrying free radicals should have migrated to different locations and re-connected with new neighbors. Polymer chains (broken or not) will exhibit active Brownian motions at a temperature substantially above the melting point. Upon cooling, the broken polymer chains, in large quantity, will recombine with new neighbors and results in enhanced chain entanglement.

According to experimental data, no significant change in crystallinity or density was seen. The chain entanglement is thought to be primarily located in the amorphous regions, similar to the micro-structure of the virgin semi-crystalline polymer before heat treatment. Since no chemical bonds are formed in Equation (vii), these paired re-connections belong to the category of physical crosslinks. Even though without chemical bonds for connection, physical crosslinks still provide significant improvement in mechanical and wear properties. In certain circumstances, it is possible for polymer rings to form (when two chain-end free radicals on the same polymer chain are re-combined) and to intertwine during the crosslinking reaction so that permanent connections as strong as chemical bonds are established in the resultant molecular network.

It is preferred to use a slow cooling rate (such as 0.1 degree C. per minute) to ensure that little residual stress is created in the final material. Slow cooling also ensures that the crystallinity meets the minimum of the industrial or medical standards. In general, slow cooling produces superior mechanical properties. It is recommended to employ inert atmosphere (vacuum, helium, nitrogen, etc.) for this cooling step so that no oxidation occurs in the material. It is preferable to use inert atmosphere in combination of gas removal and later removal of existing oxidation in the material.

The process (100) may further include second optional step (205) of removing the gases from the oven on a continuous or stepwise basis.

The process (100) may further include a second optional step (210) of subjecting the block to radiation before placing the block into the oven; and minimizing removal of gases from the oven. In an alternative embodiment (215), instead of minimizing removal of gases from the oven, the step is removing the gases from the oven on a continuous or stepwise basis so that a significant amount of gas (hydrocarbon, oxygen, and water) species produced by C—C breakage reactions are removed from the oven atmosphere.

Irradiation serves to form free radicals in the polyolefin. The type of radiation typically includes gamma rays, e-beams, or ultraviolet (UV) light. Due to the high energy exposure, carbon-hydrogen and carbon-carbon bonds are broken creating free radicals that carry a single, un-paired electron. Free radical sites are highly reactive. They tend to react with oxygen, moisture or between themselves.

During irradiation and post-irradiation storage, some free radicals are reacted with each other to form chemical crosslinks. These crosslinks are formed at sites close to free radicals. The distribution of crosslinks tends to follow the radiation dose profile which is non-uniform. Upon storage, some free radicals also react with oxygen and moisture in air causing oxidative effects which are undesirable in general. When the radiation dose is high, a pair of carbon-carbon bond breakages can occur at near-by sites, producing gases, liquids, or short chain polymer solids. In general, gases escape from the polymer matrix, while liquids either stay in or evaporate off the polymer matrix. The short chain fractions tend to re-crystallize, increasing the density of the material. All the three events result in a loss of inter- and intra-molecular connection and thus weaken the material strength, which is addressed in the fourth optional step (230).

The process (100) may further include a fourth optional step (230) of determining a heating time period for the block prior to the step of heating the block to a temperature at least 30 degrees Centigrade above the melting point, said temperature causing the carbon-carbon bond breakage within the microstructure. This determining step involves subjecting control blocks of the same polyolefin material in the same shape to the process of claim 1 for varying periods of heating time at a selected temperature to see what level of carbon-carbon bond breakage within the microstructure occurs in those time periods at that temperature. When this is done for multiple temperatures, the analysis of those samples will reveal the optimum temperature and time period for heating.

The heat treatment in the fourth optional step (230) redistributes free radicals and crosslinks in the irradiated polymer in a uniform manner. This heat treatment will also remove oxidative products in the material. In addition, short chain fractions of the material are re-connected with the polymer matrix.

It is well known that some free radicals react to form crosslinks during or after radiation. The residual free radicals can exist in either crystalline or amorphous regions of the semi-crystalline polymer. Previous methods attempt to reduce or eliminate residual free radicals by promoting paired reactions between free radicals to form chemical crosslinks. These prior methods use annealing or re-melting to move free radicals along the polymer backbone via the so-called "hydrogen hopping" mechanism until two electrons meet each other and react. However, crosslinks formed during annealing or re-melting are located within the regions where the radiation dose is received. Since the radiation dose is non-uniform across the material dimension, the number of crosslinks is also unequal at various parts of the material.

To obtain uniform distribution of crosslinks, the first required step is for the existing crosslinks to break and to re-create free radicals. In view of the bond energy of carbon-carbon (herein C—C) covalent bonds (about 83 kcal per mole) and through experimentation using the present process, it has been determined that for UHMWPE, the temperature must be at least 160 C (the melting point of UHMWPE is 130-140 C) for the C—C breakage to take place at measurable level. For practical use, the temperature should be between 180 and 400 C. Similar to other chemical reactions, the reaction rate of C—C breakage is increased with increasing temperature and the extent of C—C breakage is increased with increasing reaction time. In principle, when the starting material is irradiated, a significant amount of free radicals is created by breakage of carbon-hydrogen bonds, as illustrated in Equation (i):

$$(CH2)_n\text{-}CH2\text{-}(CH2)_m \rightarrow (CH2)_n\text{-}C^*H\text{—}(CH2)_m + H^* \quad \text{(i)}$$
(Carbon-hydrogen breakage)

(where n and m depict multiple repeating CH2 units, while * designates an un-paired electron).

From above, side atom hydrogen is broken off the polymer backbone, creating an alkyl free radical and a hydrogen free radical. Alkyl free radicals then react with each other to form chemical crosslinks during radiation and storage, as illustrated in Equation (ii):

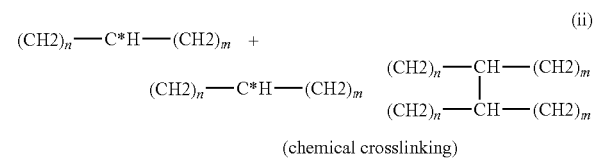
(chemical crosslinking)

The present process acts to reverse the reaction of Equation (ii):

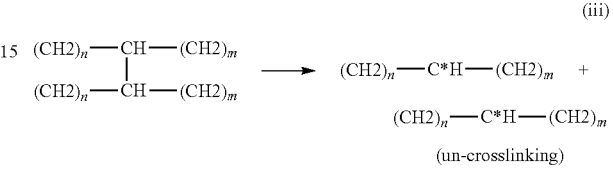
(un-crosslinking)

The reaction products in Equation (iii) will continue to decompose at high temperatures according to Equation (iv):

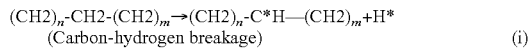
(further decomposition) (iv)

Given sufficient time, Equation (iv) will produce low molecular weight hydrocarbons. Newly produced liquids will be contained in the polymer while gases will escape into the gas atmosphere in the oven. To avoid undesirable material degradation, gases in the oven should be retained in the oven so that the extent of Equation (iv) is limited. In practice, if no gas is removed from the oven, reactions in Equation (iv) will be biased towards the left.

Equation (iii) represents bond breakage reactions between branched C—C bonds. At a high temperature for a sufficient time, short chain hydrocarbon free radicals will be formed due to these breakage reactions, as described in Equation (iv).

As the molecular weights get reduced, some will become gases and escape from the polymer matrix. At the same time, broken free radicals can re-connect to form larger molecules.

If the gases are formed in the interior of the material, the probability is high that they will recombine into large molecules and consolidate into the polymer matrix during the path of diffusion-out.

On the other hand, if gases are formed in the surface zone, the escape is likely successful. In the interior part, there is a balance between escape and re-capture of gases. As a result, the net loss of material is limited.

In contrast, when a significant loss of material occurs in the surface zone, the loss of material is accompanied by a color change. When a small amount of the material is lost, the color of the surface turns light yellowish. As the material loss is increased (by increasing temperature and time, or gas leakage), the color turns to dark brown, or even black. Furthermore, there is a tendency for the damaged material to actively absorb oxygen when the material is exposed to air.

When processing an irradiated block, even though little gas is permitted to escape from the oven, there is a small amount of the surface material to be removed before use. A quantitative method is preferred to assess the thickness of the damaged surface zone: (i) exposing the treated material in air for at least an hour (preferably several hours), (ii) using FTIR to obtain the oxidation index profile along the axis of diameter or thickness (ASTM 2102), (iii) when the oxidation index (decreasing with increasing depth) is smaller than a predetermined negligible level (such as 0.01) at a specific depth, the surface zone thickness is determined. The damaged surface zone should be removed at the conclusion of the process and prior to use of the treated material.

To enable uniform crosslinking, all free radicals (residual from radiation and those newly created by breakage of C—C crosslinks) to distribute uniformly. At a temperature higher than 160 Centigrade, free radicals can readily migrate within the molten material via hydrogen hopping. If the temperature is uniform throughout the material, the free radicals will be distributed uniformly.

Although not preferred, one need not pre-determine the heating time period and optimum temperature to perform the process. One may simply employ the process for a selected period of time at a temperature at least 30 degrees Centigrade above the melting point and this will effectively be the temperature causing carbon-carbon breakage. Preferably, however, the temperature and heating time period will be pre-determined by processing control blocks for various times and temperatures to determine the optimal heating time period and temperature.

The time it takes to reach uniform crosslinking depends on the dimensions of the material block, the convective gas flow in the oven, the gas escape rate out of the oven, the oven temperature, and the treatment time. Therefore, it is preferable to pre-determine the temperature-time combination for a given oven setup and a production lot.

The fourth optional step (230) of determining a heating time period uses control blocks with similar dimensions to those in production lot. These are placed in the oven and one is taken out at time intervals, such as every 30 minutes. Each control block is removed from the oven and cooled to obtain a solid form for the analysis of crosslinking density profile at the heating interval to which is was subjected. A typical analysis would use ASTM D2765, xylene extraction or swelling methods, and would analyze along two axial profiles for circular rods (one along the radial thickness and another one along the length), or three axial profiles for rectangular blocks (thickness, width, and length). In practice, it is acceptable to only analyze the axial profile with the controlling heat conduction path (such as the thickness profile for a 1-ft-long 3-inch rod, or the 3-inch-thickness profile for a 12-inch×12-inch×3-inch block).

When the distribution of the crosslinking density (judged by average, minimum. maximum, and standard deviation, or other statistical methods) in the material is within a pre-determined target, the heat treatment time is reached. If the treatment time is found to be too long (more than 24 hours, for example), the oven temperature can be increased to shorten the treatment time.

More specifically the fourth optional step (230) includes determining the heating time period by: placing into the oven a plurality of control blocks of the same polyolefin material comprising the initial shape; heating the plurality of control blocks to a temperature at least 30 degrees Centigrade above the melting point, said temperature causing the carbon-carbon bond breakage within the microstructure; withdrawing from the oven a first control block from within the plurality of control blocks, said withdrawing occurring at a first heating time interval; cooling the first control block; analyzing the crosslinking density distribution in the first control block along an axis of diameter or thickness; removing from the oven a second control block from within the plurality of control blocks, said removing occurring at a second heating time interval after the first heating time interval; analyzing the crosslinking density distribution in the second control block; and determining the sufficiency of carbon-carbon bond breaking by comparing the crosslinking density distribution between the first control block and the second control block.

The process (100) may further include a fifth optional step (240) of analyzing the degree of oxidation inward from the surface of the first control block and the second control block.

Example 2

For producing a polymer with uniform chemical crosslinking and enhanced physical crosslinking, steps include:
(1) Using solid UHMWPE block as the starting material;
(2) Subjecting the UHMWPE block to radiation;
(3) Placing the irradiated UHMWPE block in an oven with controlled purge gas flow (in, out, and internal circulation), heating, and cooling capabilities;
(4) Pre-heating the UHMWPE block at a temperature which is about 0-30 C above the melting point (such as 170 C; UHMWPE's melting point is about 130-140 C) until the block is completely melted (due to the abundant chain entanglement, the molten UHMWPE block maintains its shape with no significant flow);
(5) Heating the UHMWPE block at a temperature at least 30 C above its melting point to cause the carbon-carbon bond breakage between existing crosslinks and along the polyethylene backbone. The gas environment in the oven can be air or inert gas (such as vacuum, nitrogen, argon, or helium). The oven chamber temperature must be uniform by a convective gas flow. Gases in the oven should be removed on continuous or stepwise basis at a specific rate;
(6) The heating time period in step (5) is pre-determined by the following steps: (a) placing a few control blocks of UHMWPE whose diameter (for circular rods), thickness (for rectangular blocks), or shape is identical to the production blocks in the oven, (b) withdrawing a control block from the oven at each time interval and analyzing the crosslinking density distribution after cooling along the axis of diameter or thickness until the distribution spread is smaller than a pre-determined level;
(7) Controlling the amount of the gas flowing out of the oven during the step (5) so that a significant amount of gas (hydrocarbon, oxygen, and water) species produced by C—C breakage reactions are removed from the oven atmosphere; and
(8) Cooling the UHMWPE block under an inert atmosphere to room temperature slowly to bring the material back to the solid state.
(9) Removing the damaged surface zone before actual use. The thickness of the damaged surface zone is determined by the following steps: (a) obtaining the oxidation index profile along the axis of diameter or thickness by FTIR (ASTM 2102), (b) when the oxidation index (decreasing with increasing depth) is smaller than a pre-determined level at a specific depth, the surface zone thickness is determined.

Example 3

For producing a polymer with uniform chemical crosslinking, the steps are:
(1) Using solid UHMWPE block as the starting material;
(2) Subjecting the UHMWPE block to radiation;
(3) Placing the irradiated UHMWPE block in an oven with controlled purge gas flow (in, out, and internal circulation), heating, and cooling capabilities;
(4) Pre-heating the UHMWPE block at a temperature which is about 0-30 C above the melting point (such as 170 C; UHMWPE's melting point is about 130-140 C) until the block is completely melted (due to the abundant chain entanglement, the molten UHMWPE block maintains its shape with no significant flow);

(5) Heating the UHMWPE block at a temperature at least 30 C above its melting point (such as 250 C) to cause the carbon-carbon bond breakage along the polyethylene backbone. The gas environment in the oven can be air or inert gas (such as vacuum, nitrogen, argon, or helium). The oven chamber temperature must be uniform by a convective gas flow. Gas escape or removal from the oven should be at a minimum level;

(6) The heating time period in step (5) is pre-determined by the following steps: (a) placing a few control blocks of UHMWPE whose diameter (for circular rods), thickness (for rectangular blocks), or shape is identical to the production blocks in the oven, (b) withdrawing a control block from the oven at each time interval (such as 30 minutes) and analyzing the crosslinking density distribution after cooling along the axis of diameter or thickness until the distribution spread is smaller than a pre-determined level (the total heating time is thus determined);

(7) Cooling the UHMWPE block to room temperature to bring the material back to the solid state;

(8) Removing the damaged surface zone before actual use. The thickness of the damaged surface zone is determined by the following steps: (a) obtaining the oxidation index profile along the axis of diameter or thickness by FTIR (ASTM 2102), (b) when the oxidation index (decreasing with increasing depth) is smaller than a pre-determined level at a specific depth, the surface zone thickness is determined.

The process (100) may further include a third optional step (220) of controlling the purge gas flow out of the oven during the preheating and heating steps to remove gases emitted from the block.

Example 4

For producing a polymer with uniform chemical crosslinking and with pre-occurred oxidation removed, the essential steps are:

(1) Using an irradiated and stored UHMWPE block as the starting material;

(2) Placing the irradiated UHMWPE block in an oven with controlled purge gas flow (in, out, and internal circulation), heating, and cooling capabilities;

(3) Pre-heating the UHMWPE block at a temperature which is about 0-30 C above the melting point (such as 170 C; UHMWPE's melting point is about 130-140 C) until the block is completely melted (due to the abundant chain entanglement, the molten UHMWPE block maintains its shape with no significant flow);

(4) Heating the UHMWPE block at a temperature at least 30 C above its melting point to cause the carbon-carbon bond breakage along the polyethylene backbone. The gas environment in the oven can be air or inert gas (such as vacuum, nitrogen, argon, or helium). The oven chamber temperature must be uniform by a convective gas flow. Gases in the oven should be removed on continuous or stepwise basis at a specific rate;

(5) The heating time period in step (4) is pre-determined by the following steps: (a) placing a few control blocks of UHMWPE whose diameter (for circular rods), thickness (for rectangular blocks), or shape is identical to the production blocks in the oven, (b) withdrawing a control block from the oven at each time interval, and analyzing (after cooling) for (i) the crosslinking density distribution along the axis of diameter or thickness by xylene extraction method (ASTM D2765) and (ii) oxidation index profile along the axis of diameter or thickness by FTIR (ASTM 2102), (c) when the crosslinking density distribution spread is smaller than a pre-determined level and when the entire oxidation index profile is below a pre-determined level, the heating step (5) is completed;

(6) Controlling the amount of the gas flowing out of the oven during the step (5) so that a significant amount of gas (hydrocarbon, oxygen, and water) species produced by C—C and C—O breakage reactions are removed from the oven atmosphere;

(7) Cooling the UHMWPE block under an inert atmosphere to room temperature slowly to bring the material back to the solid state;

(8) Removing the damaged surface zone before actual use. The thickness of the damaged surface zone is determined by the following steps: (a) obtaining the oxidation index profile along the axis of diameter or thickness by FTIR (ASTM 2102), (b) when the oxidation index (decreasing with increasing depth) is smaller than a pre-determined level at a specific depth, the surface zone thickness is determined.

In regard to step (1) of Example 4, oxidation can occur during the consolidation process of a virgin polymer. Consolidation processes, where polymer resin powder is converted into a solid material, include ram extrusion, compression molding of large blocks or shapes, pre-forms of finished products, and finished products. During consolidation, polymer can be oxidized due to high temperature and pressure. Oxidation, once formed, can continue to spread and grow as free radicals in the material react with air or moisture in air. Radiation (gamma rays, e-beam, etc.) is often used to induce crosslinking in the polymer. Since the polymeric material often contains a small amount of air in the interior, oxidation occurs during radiation. Free radicals produced by radiation continue to react with air or moisture for more oxidation during storage. Equations (i), (viii) and (ix) describe general oxidative reactions. The important elements are free radical formation, peroxides formation, and successive chain-reactions:

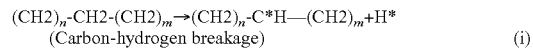
(Carbon-hydrogen breakage)     (i)

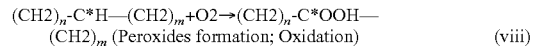
(CH2)$_m$ (Peroxides formation; Oxidation)     (viii)

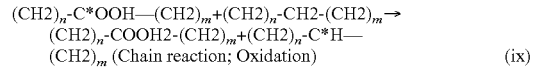
(CH2)$_m$ (Chain reaction; Oxidation)     (ix)

As noted, oxidation tends to reduce material strength and is undesirable.

In regard to the heating step, step (4) of Example 4, In addition to Equations (iii) and (v), oxygen can be removed from the material in the similar temperature range, as described in Equations (x) and (xi) for de-oxidation:

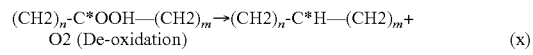
O2 (De-oxidation)     (x)

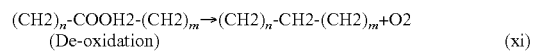
(De-oxidation)     (xi)

The carbon-oxygen (herein abbreviated as C—O) bond energy is about 85 kcal per mole, very close to 83 kcal per mole for C—C bonds. At high temperatures, Equations (X) and (XI) are active in the right direction to eliminate oxygen from the oxidized material.

Example 5

For producing a polymer with uniform chemical crosslinking and with reduced short chain fractions, steps include:
(1) Using an irradiated UHMWPE block as the starting material;
(2) Placing the irradiated UHMWPE block in an oven with controlled purge gas flow (in, out, and internal circulation), heating, and cooling capabilities;
(3) Pre-heating the UHMWPE block at a temperature which is about 0-30 C above the melting point (such as 170 C; UHMWPE's melting point is about 130-140 C) until the block is completely melted (due to the abundant chain entanglement, the molten UHMWPE block maintains its shape with no significant flow);
(4) Heating the UHMWPE block at a temperature at least 30 C above its melting point to cause the carbon-carbon bond breakage along the polyethylene backbone. The gas environment in the oven can be air or inert gas (such as vacuum, nitrogen, argon, or helium). The oven chamber temperature must be uniform by a convective gas flow. Gas escape or removal from the oven should be at a minimum level.
(5) The heating time period in step (5) is pre-determined by the following steps: (a) placing a few control blocks of UHMWPE whose diameter (for circular rods), thickness (for rectangular blocks), or shape is identical to the production blocks, (b) withdrawing a control block from the oven at each time interval and analyzing (after cooling) for (i) the crosslinking density distribution along the axis of diameter or thickness by xylene extraction method (ASTM D2765) and (ii) short chain fraction index profile along the axis of diameter or thickness by Differential Scanning Calorimetry (DSC) (ASTM F2625), (c) when the crosslinking density distribution spread is smaller than a pre-determined level and when the entire short chain fraction index profile is below a pre-determined level, the heating step (5) is completed;
(6) Controlling the amount of the gas flowing out of the oven during the step (5) so that a significant amount of gas (hydrocarbon, oxygen, and water) species produced by C—C breakage reactions are removed from the oven atmosphere;
(7) Cooling the UHMWPE block under an inert atmosphere to room temperature slowly to bring the material back to the solid state.
(8) Removing the damaged surface zone before actual use. The thickness of the damaged surface zone is determined by the following steps: (a) obtaining the oxidation index profile along the axis of diameter or thickness by FTIR (ASTM 2102), (b) when the oxidation index (decreasing with increasing depth) is smaller than a pre-determined level at a specific depth, the surface zone thickness is determined.

In regard to the heating step, step (4) in Example 5, short chain fractions can be produced by radiation energy, as further described in Equations (XII) and (XIII):

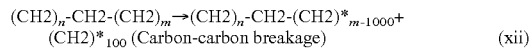

$$(CH_2)_n\text{-}CH_2\text{-}(CH_2)_m \rightarrow (CH_2)_n\text{-}CH_2\text{-}(CH_2)^*_{m-1000} + (CH_2)^*_{100} \text{ (Carbon-carbon breakage)} \quad \text{(xii)}$$

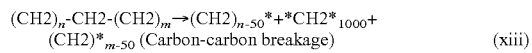

$$(CH_2)_n\text{-}CH_2\text{-}(CH_2)_m \rightarrow (CH_2)_{n-50}^* + {}^*CH_2{}^*_{1000} + (CH_2)^*_{m-50} \text{ (Carbon-carbon breakage)} \quad \text{(xiii)}$$

In the above, Equations (xii) and (xiii) both describe a production of a short chain (with 1000 CH2 units). Equation (xii) accomplishes this with a single chain scission, while Equation (xiii) as a result of two chain scissions on the same molecule. In either case, if the short chains are gases, they will escape from the polymer matrix. If they are liquids or solids at room temperature, they will stay in the material, which tend to deteriorate the material property. At similar temperature ranges where Equations (iii) and (V) are active, short chains will also break further, creating free radicals, as represented by the example of Equation (xiv):

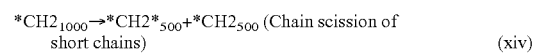

$$*CH2_{1000} \rightarrow *CH2*_{500} + *CH2_{500} \text{ (Chain scission of short chains)} \quad \text{(xiv)}$$

In the above example, the short chain with 1000 CH2 units is split into two free radicals (each with 500 CH2 units). These free radicals are now ready to react with other free radicals, as discussed later.

In regard to heating step (5) of Example 5, when short chain fractions are present in the material following radiation, Differential Scanning Calorimetry melting traces will show partial melting at a temperature lower than the melting point of the material (such as partial melting at 100 C while the major melting peak at 135 C). Short chain fraction can then be calculated as the ratio of the peak areas between the early melting and the normal melting. One can monitor the progress of short chain elimination.

The polyolefin produced by the preferred processes are unique in that it contains a uniform crosslinking level previously unattainable and it is therefore part of the invention disclosed.

There are also known processes that have been used for improvement of polymeric materials. These include mechanical deformation, uni-directional drawing, bi-axial drawing, orientation, electromagnetic field, or addition of a free radical scavenger (such as vitamin E), etc. However, none of these known processes or the like can act alone to break C—C bonds or redistribute free radicals in the polymeric material. Subsequently, uniform crosslinking cannot be obtained using any of these known processes alone, but such process could conceivably be combined with the present process to improve the polymeric material. Therefore, a combination of any of these known processes with the methods taught by the invention, for the purpose of creating uniform physical or chemical crosslinking, is within the scope of the invention.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the synthetic resin industry.

What is claimed is:
1. A process for producing an ultrahigh molecular weight polyethylene polymer with uniform chemical crosslinking, the process comprising the steps of:
providing an oven adapted to control: purge gas flow into and out of the oven; purge gas flow circulation or vacuum conditions within the oven; heating rate; and cooling rate;
placing a block of ultrahigh molecular weight polyethylene material into the oven, the block comprising an initial shape and a melting point and the ultrahigh molecular weight polyethylene material comprising a microstructure of carbon-carbon bonds;

preheating the block to a preheating temperature above the melting point and up to about 30 degrees Centigrade above the melting point, said preheating temperature keeping bond breakage reactions inactive, and holding said preheating temperature until such time as the block has a uniform temperature with no significant change in the initial shape, said block then comprising a pre-heated block;

heating the pre-heated block to a temperature above the preheating temperature and at least 30 degrees Centigrade above the melting point, said heating temperature causing carbon-carbon bond breakage within the microstructure;

terminating heating of the block in the oven when a predetermined crosslinking density level is reached;

cooling the block to room temperature under an inert gas to bring the material back to a solid state; and removing any oxidized material from surface of the block to produce a block with uniform chemical crosslinking.

2. The process of claim 1, further comprising the step of removing the gases from the oven on a continuous or stepwise basis.

3. The process of claim 1, further comprising the steps of:
subjecting the block to radiation before placing the block into the oven; and
removing the gases from the oven on a continuous or stepwise basis.

4. The process of claim 1, further comprising the steps of:
subjecting the block to radiation before placing the block into the oven; and
minimizing removal of gases from the oven.

5. The process of claim 1, further comprising the step of controlling the purge gas flow out of the oven during the preheating and heating steps to remove gases emitted from the block.

6. The process of claim 1, further comprising the step of determining a heating time period for the block prior to the step of heating the preheated block to a temperature above the preheating temperature and at least 30 degrees Centigrade above the melting point, said heating temperature causing carbon-carbon bond breakage within the microstructure; wherein determining the heating time period comprises the steps of:

placing into the oven a plurality of control blocks of the ultrahigh molecular weight polyethylene material comprising the initial shape;

heating the plurality of control blocks to a temperature at least 30 degrees Centigrade above the melting point, said temperature causing the carbon-carbon bond breakage within the microstructure;

withdrawing from the oven a first control block from within the plurality of control blocks, said withdrawing occurring at a first heating time interval;

cooling the first control block;

analyzing the crosslinking density distribution in the first control block along an axis of diameter or thickness;

removing from the oven a second control block from within the plurality of control blocks, said removing occurring at a second heating time interval after the first heating time interval;

analyzing the crosslinking density distribution in the second control block; and determining sufficiency of carbon-carbon bond breaking by comparing the crosslinking density distribution between the first control block and the second control block.

7. The process of claim 6, further comprising the step of analyzing a degree of oxidation inward from the surface of the first control block and the second control block.

8. An ultrahigh molecular weight polyethylene polymer with uniform chemical crosslinking produced by the process of claim 1.

* * * * *